Nov. 13, 1962  G. A. CALKINS  3,063,068
BOAT CONSTRUCTION
Filed Dec. 24, 1958  2 Sheets-Sheet 1
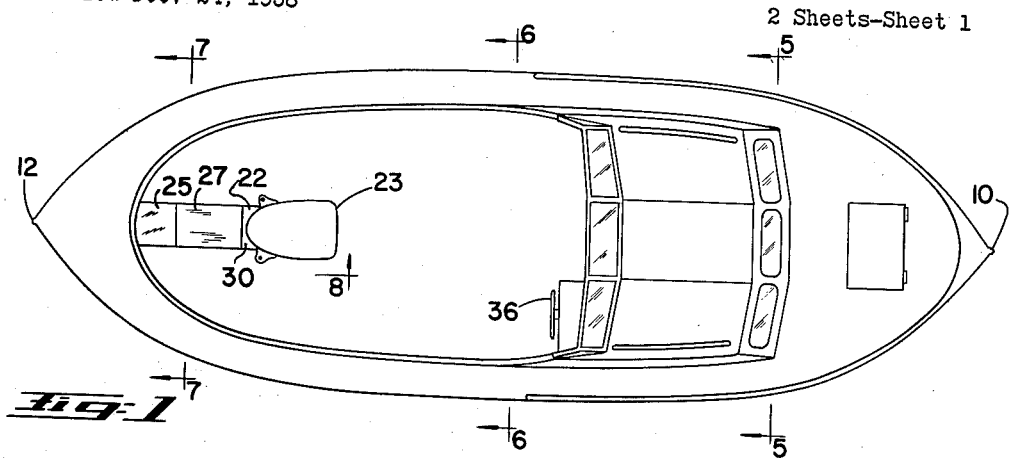
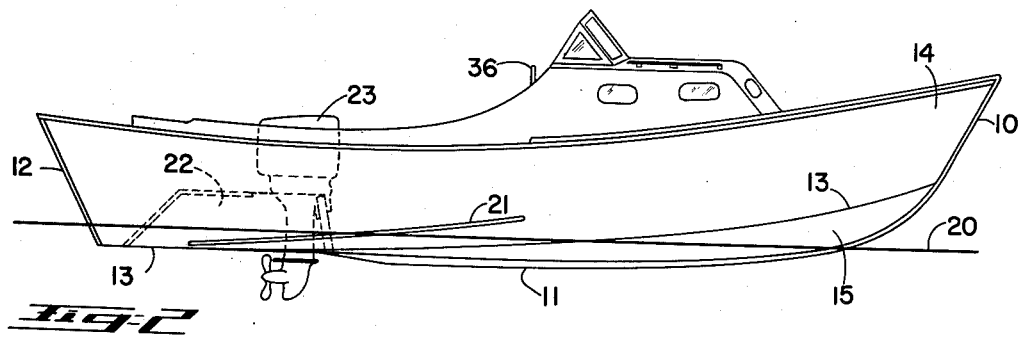
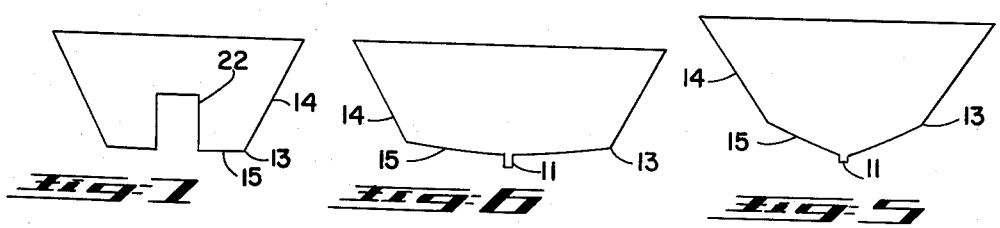
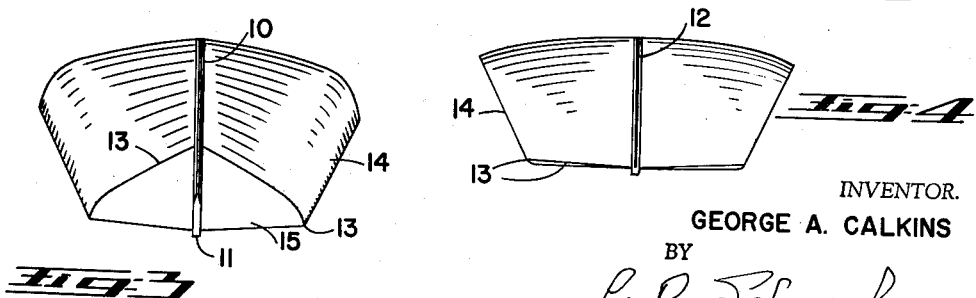
INVENTOR.
GEORGE A. CALKINS
BY
ATTORNEY Nov. 13, 1962
G. A. CALKINS
3,063,068
BOAT CONSTRUCTION
Filed Dec. 24, 1958
2 Sheets-Sheet 2
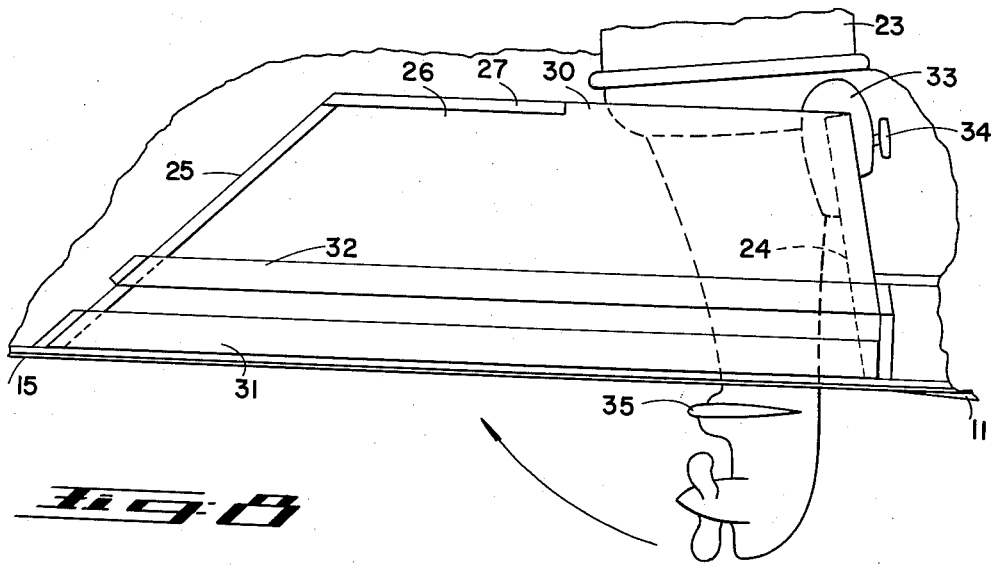
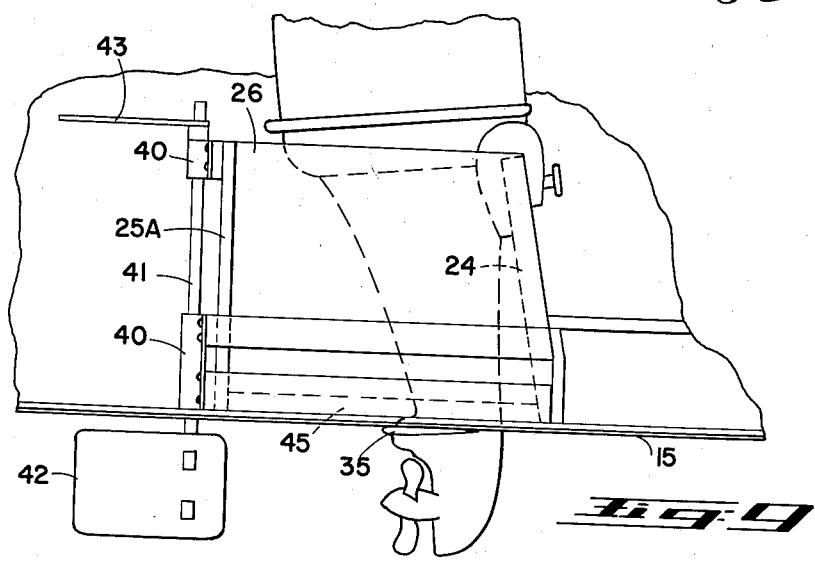
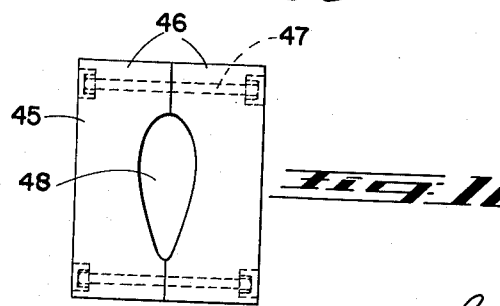
INVENTOR.
GEORGE A. CALKINS
BY
ATTORNEY

United States Patent Office 3,063,068
Patented Nov. 13, 1962

3,063,068
BOAT CONSTRUCTION
George A. Calkins, Delake, Oreg., assignor to Calkins Craft Boat Co., McMinnville, Oreg., a corporation of Oregon
Filed Dec. 24, 1958, Ser. No. 782,934
1 Claim. (Cl. 9—6)

This invention relates to a novel and improved form of construction for small boats.

On the basis of function and performance, small boats can be divided generally into two distinct classes. In one class there is the sturdy, seaworthy type of boat which can cope with stormy weather and rough water. This type of boat is invariably of deep draft, heavy construction and cannot be propelled at high speed regardless of the size of power plant that may be installed. Such boats are used for commercial fishing in the open sea, for lifeboats on a sea-going vessel and for life-saving activities, such as Coast Guard work in coastal waters.

The other class of boats is exemplified by the light weight, shallow displacement pleasure craft, such as speed boats and cabin cruisers which will plane on the surface of the water with an engine of moderate power and will readily attain still higher speeds with more powerful engines. This general class of boats is not considered seaworthy in rough water and such boats are never taken out in bad weather.

There has long been a need for a small boat in the twenty to thirty-five foot range which would satisfactorily combine the best characteristics of both of the above classes. Coastal fishermen, for example, often must travel quite far from land in order to find the fish they are seeking. Since conventional high speed boats are out of the question for year around use in bad weather as well as fair, the fisherman has had no choice but to select the slow and heavy boat which is seaworthy. Conventional fast boats are likewise impractical for life-saving purposes since in this class of service the need arises chiefly in bad weather when rough seas are running. Also, even in fair weather, both fishermen and life-saving crews encounter rough water in the locality of bars and reefs, particularly at the entrances to rivers and harbors which may provide attractive fishing grounds for both commercial and amateur fishermen.

The conventional slow and heavy boat has an obvious shortcoming for both fishing and life-saving work. The fisherman often must travel many miles at a laboriously slow pace to find his quarry in the first place and then, homeward bound, much time is consumed in getting his valuable and highly perishable cargo to port. Then, after a tedious return trip to the successful fishing location, so much time ordinarily elapses that the fish have moved elsewhere and must be re-located. In the case of life-saving activities by the Coast Guard, speed is often essential in reaching the scene of a disaster or in rescuing a disabled craft or crew from an imminent disaster. Thus, in addition to all the nautical requirements discussed above, rescue boats must be of such size and weight that they can be moved quickly along coastal roads and highways by automobile trailer. Conventional small boat design has not provided a solution to such conflicting requirements.

The general object of the present invention is, therefore, to provide a small boat which is seaworthy and which is also capable of relatively high speeds. Another object is to provide a boat of such characteristics which is particularly adapted to serve the needs of fishermen and life-saving organizations such as the Coast Guard. Another object is to provide a boat of the type described which is adapted to be powered either by an inboard or outboard type of engine. Another object is to provide a novel and improved type of well and mounting arrangement for an outboard motor in a boat. Another object is to provide a hull shape having the characteristics described which can be conveniently and economically planked with large panels of plywood. Another object is to provide a boat of the type described which is relatively light in weight and inexpensive to construct and yet just as rugged and seaworthy as conventional boats used for fishing and life-saving.

The novel features of the present invention involve chiefly the shape of the boat hull which may be aptly described as a V-bottom, high-speed, double-ender. The bow and midship sections generally follow the accepted cross section profiles of a high-speed cabin cruiser type. The stern, however, departs radically from conventional design. There is no broad stern with a flat transom board to create turbulence and suction behind the boat when it is heavily loaded or to receive the pounding of the waves when they overtake the boat stern-on in the stern quarter. It is well recognized by small boat operators that a broad and flat transom throws a small boat out of control in a following sea.

The present hull shape is distinguished by the chines meeting at a common point at the lower end of a stern post. There is no transom board nor even the triangular flat end of a dory. Aft of the midsection the bottom flat but, instead of remaining broad, it converges to a point at the stern post. When heavily loaded, the boat moves easily through the water and is extremely seaworthy under all conditions of loading. When carrying a normal or light load, the boat planes on the water in the same manner as a speed boat or high-powered cabin cruiser type. This hull shape is to be distinguished from other double enders having a chine which rises at the stern the same as at the bow. Under increased power such boats rock up in front and will not plane on the water.

The high speed performance is best explained by describing the behavior of a typical boat as illustrated in the accompanying drawing which is twenty-two feet long and weighs only 1250 pounds without motor or any special equipment. On a relatively calm sea, a 65 horse power inboard motor propels the boat at twenty-six miles per hour with two people aboard. An identical boat equipped with a well and outboard motor, as shown on the drawing, is propelled at a speed of twenty-five miles per hour with two people aboard using a 50 horsepower motor. Using a 70 horse power motor the same boat attains a speed of thirty-one miles per hour with two people abroad. Such speeds, when the condition of the sea permits, are highly advantageous both to fishermen in searching out a school of fish and to life-saving crews in reaching their objectives as quickly as possible. These speeds are to be compared with the 8 miles per hour normally attained by conventional fishing and life-saving boats.

The foregoing performance data were obtained from boats built for rescue work which had to be conveniently transportable by highway and capable of being launched in the surf from an automobile trailer. In uses where highway transportation is not required, the boats may be built much larger without sacrificing any of the nautical features and advantages of the invention.

Additional objects and advantages will become apparent from the following detailed description of certain preferred embodiments illustrated on the accompanying drawings. Various changes may be made, however, in the details of construction and arrangement of parts, and all such modifications within the scope of the appended claims are included in the invention.

In the drawings:

FIGURE 1 is a top plan view of a boat embodying the features of the present invention;

FIGURE 2 is a side elevation view of the boat shown in FIGURE 1;

FIGURE 3 is an end elevation view of the boat at the bow;

FIGURE 4 is an end elevation view of the boat at the stern;

FIGURES 5, 6 and 7 are cross section profiles showing the hull shape at the stations 5—5, 6—6 and 7—7, respectively, in FIGURE 1;

FIGURE 8 is an enlarged longitudinal sectional view showing the outboard motor well;

FIGURE 9 is a similar view showing a modified arrangement; and

FIGURE 10 is a plan view showing a closure plate for the motor well in FIGURE 9.

The framing of the boat is not shown in detail, but comprises, in general, transverse rib frames, a stem post 10 at the bow, a keel 11, and a stern post 12. It will be appreciated that the stem post may be covered by a stem cap, and that the stern post may be covered by a stern cap, but, in order to facilitate the description, these caps which appear in exterior views will be considered and identified as parts of the stem post and stern post. Similarly, the main longitudinal structural member is preferably a keelson, not shown, which overlies the keel 11 inside the bottom planking, but for descriptive purposes the keelson and keel will be considered together as the keel of the boat.

The rib frames are connected by chine strips, not shown, at the chines 13. The boat is contoured to receive plywood side panels 14 above the chines and plywood bottom panels 15 below the chines. The side planking or panels 14 extend from the stem post 10 to the stern post 12. The bottom planking or panels 15 provide a V-bottom shape forward and a flat bottom shape from amidships to the stern post, as shown in FIGURES 5 to 7. the chines 13 start at the stem post well above the water line 20 and extend downward in sweeping curves to the lower end of stern post 12. At the mid section, FIGURE 6, the bottom is approximately flat and a short distance behind mid section the bottom becomes truly flat in both longitudinal and transverse directions as is apparent in FIGURES 2 and 7.

A spray rail 21 starts at amidships above the chine and water line and converges toward the chine at its rear end which is spaced some distance forward from the stern post at a point where the bottom begins to narrow rapidly toward the stern post. The rear end of the spray rail is below the water line and close to the chine.

Both the stem post and stern post slope at about the same angle from the vertical, as shown in FIGURE 2, whereby the deck length is somewhat longer than the length of the boat at the water line. The boat has a normally shallow draft for planing when lightly loaded but is completely seaworthy and handles safely when heavily loaded.

The hull shape as above described may be driven equally well by either an inboard or outboard engine. FIGURES 1, 2 and 8 illustrate a well 22 for an outboard motor 23. The well comprises a pseudo transom board 24, a sloping rear board 25, a pair of parallel vertical longitudinal side boards 26, and a short top board 27. Top board 27 extends from rear board 25 to a point short of the transom board 24 in order to leave a top opening 30 ot receive the motor. The bottom edges of transom board 24, rear board 25, and side boards 26 are sealed to the bottom planking in watertight joints about a bottom opening which is coextensive with the rectangular outline of the well. Both the keel and keelson end at the transom board 24, but a short length of keelson may be provided between the rear board 25 and stern post 12, if desired. In the present boat the well extends rearwardly so close to the stern post that such additional piece of keelson is not necessary. The box structure of the well just described is equipped on its outer surface, within the boat, with a bottom cleat 31 and a deck cleat 32 for supporting and securing the bottom planking and deck planking about the well.

The outboard motor 23 is equipped with the usual mounting bracket 33 and clamp 34 for mounting on the transom board 24. The top edge of the transom board is preferably at such height that the cavitation plate 35 on the motor will be about two inches below the bottom of the boat. Such motors are pivoted on a horizontal axis in the mounting bracket 33 so that the motor will swing up into the wall, as indicated by the arrow in FIGURE 8, in which position no part of the motor projects below the bottom of the boat. The boat is steered by turning the motor on its vertical steering axis either by the tiller provided on the motor (not shown) or by ropes or cables (not shown) connected in the usual manner to a steering wheel 36. In order to facilitate steering it is desirable to locate the motor well as close to the stern as possible.

Another drive arrangement is shown in FIGURE 9. In this case the well is considerably shorter, having a length approximately equal to the length of opening 30 in FIGURE 8. The back board 25a is vertical and carries bearings 40 for a rudder post 41 projecting through the bottom of the boat. Rudder 42 is thereby placed directly in the wash of the propeller and preferably closely adjacent the stern post of the boat, the well being located to establish this relationship. The upper end of the rudder post is equipped with a quadrant plate or tiller arm 43 to which are attached the steering lines leading to steering wheel 36.

In FIGURE 9, the bottom of the well is closed by a closure plate 45 to reduce turbulence and also to prevent water from being driven up in the well by the propeller. Closure plate 45 comprises a pair of boards 46 secured together by bolts 47. The boards are cut out to form a central opening 48 to fit the vertical drive shaft housing of the motor just above the cavitation plate 35. The length and width of plate 45 are such that the plate will fit loosely in the bottom end of the well with bottom surface of the plate even with the bottom surface of the boat. Transom board 24 is the proper height to establish this relationship with a particular size of outboard motor appropriate to the boat. Opening 48 fits the motor housing snugly so that the two boards 46 are clamped firmly thereon and supported thereby when nuts are tightened on the bolts 47. Plate 45 does not keep water out of the well but merely prevents turbulence and drag from the opening in the bottom of the boat and prevents propeller wash from being driven against back board 25a.

Closure plate 45 holds the motor rigid so that it will neither turn nor tilt in the well. If protection is needed for the propeller and rudder, a suitable skeg may be provided on the bottom of the boat.

Spray rail 21 serves not merely to keep the occupants of the boat dry but also has an important function in stabilizing the boat at high speed. The spray rail is located in the position described in order to prevent a stern wave from following the contour of the rounded stern and creating a suction on one side which pulls the boat off course when it is carrying a lopsided load in relatively smooth water. When the boat is planing in smooth water with a pronounced list, a stern wave is created which tends to cause the boat to deviate from course. The spray rail, by deflecting such wave away from the boat, removes the deviating force and allows the boat to keep on course. The relatively small projection of only one or two inches is sufficient to effect the desired correction.

When the keel or keelson is not interrupted by an outboard motor well, it joins the bottom end of the stern post at a common point of intersection with the chines.

Having now described my invention and in what manner the same may be used, what I claim as new and desire to protect by Letters Patent is:

A power boat hull having pointed bow and stern portions including a stem post and a stern post, sharp cornered chines extending from an elevated point on said stem post to the lower end of said stern post, spray rails above said chines starting at approximately mid-section at a distance above said chines and above normal water line and converging rearwardly toward said chines, a keel extending from said stem post at least to mid-section, plywood side panels above said chines flaring upward and outward from said chines at all sections intermediate said stem and stern posts, and plywood bottom panels between said chines and keel, said bottom panels forming a V-bottom forward of mid-section which gradually flattens into a transversely flat bottom between said chines behind mid-section, said flat bottom tapering in width from mid-section to a point at said stern post, said flat bottom also being flat in a longitudinal direction and parallel with the normal water line and at the same distance below the normal water line as the lowest point of the keel line of said V-bottom portion.

References Cited in the file of this patent

UNITED STATES PATENTS

| | | |
|---|---|---|
| 647,591 | Williams | Apr. 17, 1900 |
| 998,437 | Wieland | July 18, 1911 |
| 1,075,726 | Prosser | Oct. 14, 1913 |
| 1,409,937 | Ferold | Mar. 21, 1922 |
| 1,840,949 | Harvey | Jan. 12, 1932 |
| 1,992,711 | Mead | Feb. 26, 1935 |
| 2,096,037 | Harvey | Oct. 19, 1937 |
| 2,165,545 | Grant | July 11, 1939 |
| 2,342,707 | Troyer | Feb. 29, 1944 |
| 2,412,455 | Hall | Dec. 10, 1946 |
| 2,478,042 | Elling | Aug. 2, 1949 |
| 2,603,799 | Hanson | July 22, 1952 |
| 2,633,817 | Pedantri | Apr. 7, 1953 |
| 2,654,102 | Frees | Oct. 6, 1953 |
| 2,677,139 | Canazzi | May 4, 1954 |
| 2,980,924 | Canazzi | Apr. 25, 1961 |

FOREIGN PATENTS

| | | |
|---|---|---|
| 9,896 | Great Britain | 1892 |